(12) United States Patent
Satomura

(10) Patent No.: US 10,740,625 B2
(45) Date of Patent: Aug. 11, 2020

(54) INFORMATION PROCESSING SYSTEM, INFORMATION PROCESSING APPARATUS, AND OUTPUT CONTROL METHOD

(71) Applicant: DENSO CORPORATION, Kariya, Aichi-pref. (JP)

(72) Inventor: Shota Satomura, Kariya (JP)

(73) Assignee: DENSO CORPORATION, Kariya, Aichi-Pref. (JP)

( * ) Notice: Subject to any disclaimer, the term of this patent is extended or adjusted under 35 U.S.C. 154(b) by 728 days.

(21) Appl. No.: 15/367,861

(22) Filed: Dec. 2, 2016

(65) Prior Publication Data

US 2017/0161567 A1 Jun. 8, 2017

(30) Foreign Application Priority Data

Dec. 4, 2015 (JP) .................................. 2015-237552

(51) Int. Cl.
*G06K 9/00* (2006.01)
*G08G 1/0962* (2006.01)
*G08G 1/0967* (2006.01)

(52) U.S. Cl.
CPC ..... *G06K 9/00791* (2013.01); *G06K 9/00818* (2013.01); *G08G 1/0967* (2013.01); *G08G 1/09623* (2013.01)

(58) Field of Classification Search
CPC .................. G06K 9/00791; G06K 9/00818
See application file for complete search history.

(56) References Cited

U.S. PATENT DOCUMENTS

| | | | | |
|---|---|---|---|---|
| 6,593,873 B2 * | 7/2003 | Samukawa | ........... | G01S 13/931 342/70 |
| 6,801,638 B1 * | 10/2004 | Janssen | .................. | B60K 35/00 382/104 |
| 7,346,222 B2 * | 3/2008 | Lee | .......................... | G06K 9/40 382/260 |
| 7,349,771 B2 * | 3/2008 | Sakuma | ................. | G01C 21/32 701/1 |

(Continued)

FOREIGN PATENT DOCUMENTS

| | | |
|---|---|---|
| JP | 2006-275690 | 10/2006 |
| JP | 2014-067185 A | 4/2014 |
| JP | 2015-118438 | 6/2015 |

*Primary Examiner* — Irfan Habib
(74) *Attorney, Agent, or Firm* — Maschoff Brennan

(57) ABSTRACT

In an information processing system, a regulation recognizer recognizes regulatory information displayed on a first indicator disposed external to a subject vehicle from a captured image. A condition recognizer recognizes conditional information displayed on a second indicator disposed external to the vehicle from the captured image. The conditional information is indicative of a condition under which the regulation indicated by the regulatory information recognized by the regulation recognizer is to be applied, where the condition is an environmental condition about an environment around the vehicle. An output controller controls outputs generated by an output generator. If the environment around the vehicle recognized by the environment recognizer satisfies the environmental condition indicated by the conditional information recognized by the condition recognizer, the output controller controls the output generator based on the regulatory information recognized by the regulation recognizer.

9 Claims, 5 Drawing Sheets

(56) References Cited

U.S. PATENT DOCUMENTS

| | | | | |
|---|---|---|---|---|
| 8,170,340 B2 * | 5/2012 | Klefenz | G06K 9/4633 | 348/148 |
| 8,174,570 B2 * | 5/2012 | Yoneyama | G06K 9/00818 | 348/135 |
| 8,340,420 B2 * | 12/2012 | Smith | G06K 9/4647 | 382/164 |
| 8,781,644 B2 * | 7/2014 | Samukawa | B60W 10/06 | 701/1 |
| 9,418,303 B2 * | 8/2016 | Zobel | G06K 9/42 | |
| 9,436,879 B2 * | 9/2016 | Zobel | G06K 9/00818 | |
| 9,536,157 B2 * | 1/2017 | Zobel | G06K 9/00798 | |
| 9,542,607 B2 * | 1/2017 | Maeda | G06K 9/4604 | |
| 9,646,214 B2 * | 5/2017 | Maeda | G06K 9/00798 | |
| 9,697,430 B2 * | 7/2017 | Kristensen | G06K 9/00818 | |
| 9,970,774 B2 * | 5/2018 | Atsmon | G08G 1/168 | |
| 9,984,568 B2 * | 5/2018 | Imai | G06K 9/00818 | |
| 10,002,534 B2 * | 6/2018 | Hu | G06K 9/00818 | |
| 10,053,087 B2 * | 8/2018 | Oooka | B60W 50/0097 | |
| 10,169,669 B2 * | 1/2019 | Yoshitomi | G06K 9/00818 | |
| 10,176,387 B2 * | 1/2019 | Kawasaki | G06T 7/60 | |
| 10,304,337 B2 * | 5/2019 | Ando | B60W 30/0956 | |
| 10,317,224 B2 * | 6/2019 | Hisano | G01C 21/3415 | |
| 10,324,470 B2 * | 6/2019 | Saito | G01C 21/3694 | |
| 10,399,592 B2 * | 9/2019 | Akatsuka | B62D 15/029 | |
| 2005/0086051 A1 * | 4/2005 | Brulle-Drews | G01C 21/3602 | 704/7 |
| 2007/0109111 A1 * | 5/2007 | Breed | G01S 17/89 | 340/435 |
| 2008/0137908 A1 * | 6/2008 | Stein | G06K 9/00818 | 382/103 |
| 2008/0199050 A1 * | 8/2008 | Koitabashi | B60R 1/00 | 382/107 |
| 2010/0302361 A1 * | 12/2010 | Yoneyama | G06K 9/00818 | 348/135 |
| 2012/0025965 A1 * | 2/2012 | Mochizuki | B60Q 9/008 | 340/435 |
| 2012/0062743 A1 * | 3/2012 | Lynam | B60Q 9/005 | 348/148 |
| 2014/0119605 A1 * | 5/2014 | Zobel | G06K 9/00818 | 382/103 |
| 2014/0240115 A1 * | 8/2014 | Igarashi | B60W 30/08 | 340/435 |
| 2017/0018177 A1 * | 1/2017 | Kurotobi | G08G 1/0145 | |
| 2018/0357484 A1 * | 12/2018 | Omata | G08G 1/00 | |
| 2019/0023241 A1 * | 1/2019 | Kumagai | G06K 9/00798 | |
| 2019/0107842 A1 * | 4/2019 | Miura | G05D 1/0246 | |
| 2019/0114493 A1 * | 4/2019 | Ewert | G05D 1/0246 | |
| 2019/0163988 A1 * | 5/2019 | Watanabe | G08G 1/16 | |
| 2019/0220029 A1 * | 7/2019 | Fukuhara | G05D 1/0251 | |
| 2019/0329699 A1 * | 10/2019 | Neukam | G06K 9/00791 | |
| 2020/0020671 A1 * | 1/2020 | Lu | G06K 9/00255 | |

\* cited by examiner

INFORMATION PROCESSING SYSTEM, INFORMATION PROCESSING APPARATUS, AND OUTPUT CONTROL METHOD

CROSS-REFERENCE TO RELATED APPLICATION

This application is based on and claims the benefit of priority from earlier Japanese Patent Applications No. 2015-237552 filed Dec. 4, 2015, the description of which is incorporated herein by reference.

BACKGROUND

Technical Field

The present invention relates to an information processing system for use in a vehicle.

Related Art

Techniques are known to recognize information displayed on a road sign or the like based on an image captured by a vehicle-mounted camera. Particularly, as disclosed in Japanese Unexamined Patent Application Publication (Translation of PCT Application) No. 2014-522049, a technique has been proposed to recognize not only a main sign that is a road sign indicating the content of a regulation or guidance, but also a supplemental sign indicating a condition under which the main sign is to be applied.

Notifying a driver of the vehicle of the information recognized from the road sign or the like allows the driver to more reliably recognize such information. However, if the regulation displayed on the main sign is communicated to the driver without the condition displayed on its supplemental sign being met, the driver may misunderstand the regulation. In addition, when the vehicle is performing automated cruise control that requires no driver's operations, the control content may be changed depending on whether or not the condition displayed on the supplemental sign is met.

Therefore, it is desired to accurately determine whether or not the condition displayed on the supplemental sign is met.

Whether or not a condition displayed on a supplemental sign and associated with an environment around the vehicle is met may be determined based on outputs of various sensors mounted in the vehicle, However, the overall configuration of a system having many sensors is likely to be complicated.

In consideration of the foregoing, exemplary embodiments of the present invention are directed to providing a technique for providing appropriate outputs in response to surrounding environments without making a system complicated.

SUMMARY

In accordance with an exemplary embodiment of the present invention, there is provided an information processing system including an imaging unit, a regulation recognizer, a condition recognizer, an environment recognizer, an output generator, and an output controller.

The imaging unit is configured to capture an image of the outside of a subject vehicle. The regulation recognizer is configured to recognize regulatory information displayed on a first indicator disposed external to the vehicle from an image captured by the imaging unit. The regulatory information is information indicative of a regulation on travel of the vehicle.

The condition recognizer is configured to recognize conditional information displayed on a second indicator disposed external to the vehicle from the image captured by the imaging unit. The conditional information is indicative of a condition under which the regulation indicated by the regulatory information recognized by the regulation recognizer is to be applied, where the condition is an environmental condition about an environment around the vehicle.

The environment recognizer is configured to recognize the environment around the vehicle from the image captured by the imaging unit. The output generator is configured to generate prescribed outputs. The output controller is configured to control the outputs generated by the output generator. The output controller is further configured to, if the environment around the vehicle recognized by the environment recognizer satisfies the environmental condition indicated by the conditional information recognized by the condition recognizer, control the output generator based on the regulatory information recognized by the regulation recognizer.

In this configuration, the conditional information is recognized from the second indicator based on a captured image, and the environment around the vehicle is also recognized from the captured image. That is, whether or not the environment satisfies the environmental condition can be determined based on an output of the imaging unit. Therefore, using the imaging unit instead of a sensor to recognize a surrounding environment allows suitable outputs for the surrounding environment to be carried out while preventing the system configuration from being complicated.

In accordance with another exemplary embodiment of the present invention, there is provided an information processing apparatus including a regulation recognizer, a condition recognizer, an environment recognizer, and an output controller. The regulation recognizer is configured to recognize regulatory information displayed on a first indicator disposed external to a subject vehicle from an image of the outside of the vehicle. The regulatory information is information indicative of a regulation on travel of the vehicle.

The condition recognizer is configured to recognize conditional information displayed on a second indicator disposed external to the vehicle from the image captured by the imaging unit. The conditional information is information indicative of a condition under which the regulation indicated by the regulatory information recognized by the regulation recognizer is to be applied, where the condition is an environmental condition about an environment around the vehicle.

The environment recognizer is configured to recognize the environment around the vehicle from the image captured by the imaging unit, The output controller is configured to control outputs generated by an output generator.

The output controller is further configured to, if the environment around the vehicle recognized by the environment recognizer satisfies the environmental condition indicated by the conditional information recognized by the condition recognizer, control the output generator based on the regulatory information recognized by the regulation recognizer.

With such a configuration, similar advantages to those of the above information processing system can be provided by cooperation of the imaging unit for outputting a captured image and the output generator for providing prescribed outputs.

In accordance with still another exemplary embodiment of the present invention, there is provided a method of controlling an output generator configured to generate prescribed outputs. The method is referred to as an output control method and includes recognizing, from an image captured by an imaging unit configured to capture an image of the outside of a subject vehicle, (i) regulatory information displayed on a first indicator disposed external to the vehicle, the regulatory information being information indicative of a regulation on travel of the vehicle, (ii) conditional information displayed on a second indicator disposed external to the vehicle, the conditional information being indicative of a condition under which the regulation indicated by the regulatory information is to be applied, the condition being an environmental condition about an environment around the vehicle, and (iii) the environment around the vehicle.

The method further includes controlling the output generator based on the regulatory information if the environment around the vehicle satisfies the environmental condition indicated by the conditional information.

With such a configuration, similar advantages to those of the above information processing system can be provided by using the imaging unit for outputting a captured image and the output generator for providing prescribed outputs.

DESCRIPTION OF SPECIFIC EMBODIMENTS

Figure 1:
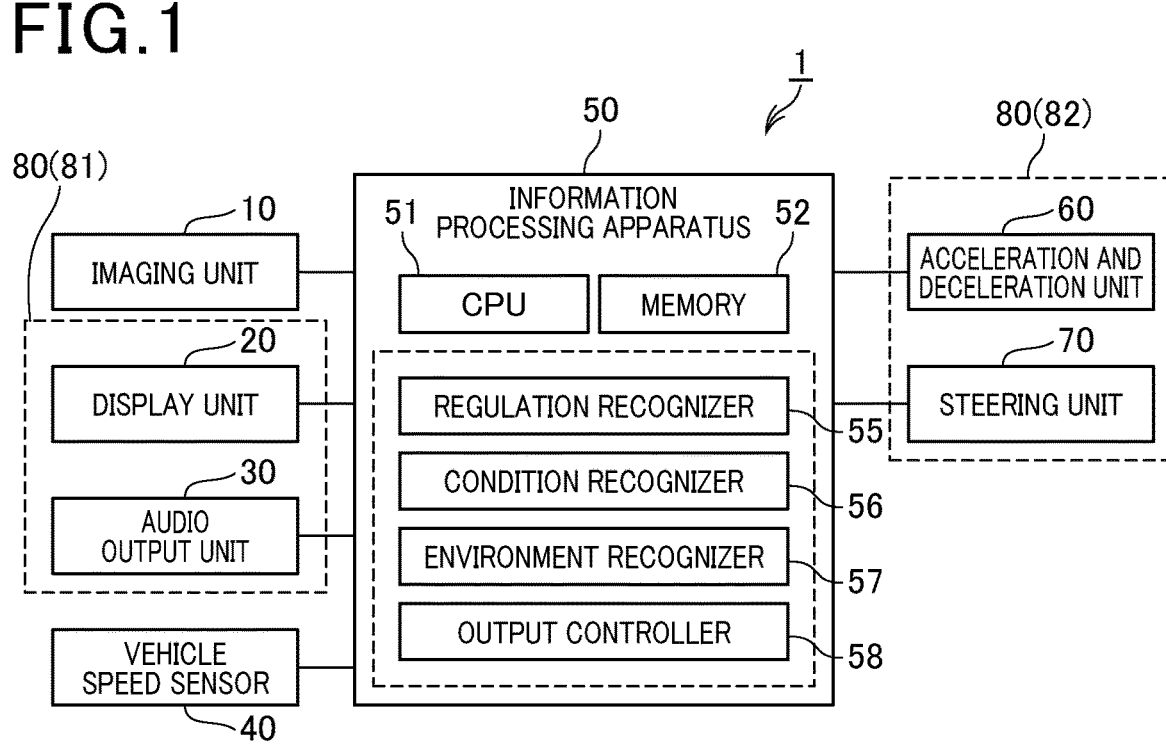
FIG. 1 is a block diagram of an information processing system in accordance of one embodiment of the present invention.

Specific embodiments of the invention will now be described with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the embodiments illustrated in the accompanying drawings is not intended to be limiting of the invention. In the drawings, like numbers refer to like elements.

System Configuration

FIG. 1 illustrates an information processing system 1 in accordance with one embodiment of the present invention. The information processing system 1 is mounted in a vehicle and includes an imaging unit 10, a display unit 20, an audio output unit 30, a vehicle speed sensor 40, an information processing apparatus 50, an acceleration and deceleration unit 60, and a steering unit 70. In the following, the vehicle carrying the information processing system 1 will be referred to as an own vehicle.

The imaging unit 10, which may be a camera for capturing an image of the outside of the own vehicle, may be mounted on and behind a rearview mirror of the own vehicle so as to capture an image looking in a forward direction, i.e., a travel direction, of the own vehicle. The imaging unit 10 is configured to capture an image looking in the forward direction of the own vehicle every predetermined time interval and output image data representative of the captured image to the information processing apparatus 50.

The display unit 20 is disposed within the own vehicle and equipped with a display screen, such as a liquid crystal display (LCD), to display an image in response to a control signal from the information processing apparatus 50. The display unit 20 may include a head-up display, a navigator, an instrument panel or the like.

The audio output unit 30 includes a speaker disposed within the own vehicle to output an audible sound in response to a control signal from the information processing apparatus 50.

The display unit 20 and the audio output unit 30 form together a notifier 81 that is configured to, when regulatory information is recognized from the captured image by the information processing apparatus 50, notify the driver of the own vehicle of the regulatory information.

The vehicle speed sensor 40 is configured to detect a vehicle speed of the own vehicle and output a vehicle speed signal that is a signal indicative of the vehicle speed to the information processing apparatus 50.

The acceleration and deceleration unit 60 includes an engine, a transmission, a brake of the own vehicle. If automated cruise control (described later) is performed, engine power of the engine, a gear shift change, a brake operation and other operations are controlled by the information processing apparatus 50 to adjust a travel speed, acceleration and deceleration of the own vehicle.

The steering unit 70 is a steering actuator for changing a tire turning angle of the own vehicle. In the present embodiment, so called by wire technologies are used, where the own vehicle electrically signals the operation of a steering wheel (not shown) to the steering unit 70, which in turn changes the tire turning angle. If the automated cruise control is performed, the information processing apparatus 50 controls the operation of the steering unit 70 regardless of the operation of the steering wheel. The acceleration and deceleration unit 60 and the steering unit 70 form together a travel controller 82 configured to generate outputs for controlling the travel of the own vehicle.

The information processing apparatus 50 may be formed of at least one microcomputer including a central processing unit (CPU) 51, and semiconductor memories (collectively indicated by memory 52 in FIG. 1), such as a random access memory (RAM), a read only memory (ROM), and a flash memory. Various functions of the information processing apparatus 50 may be implemented by the CPU 51 executing computer programs stored in a non-transitory computer readable storage medium.

The information processing apparatus 50 includes, as functional blocks, a regulation recognizer 55, a condition recognizer 56, an environment recognizer 57, and an output controller 58. These blocks corresponds to the respective functions of the information processing apparatus 50. Various implementations of these blocks described herein can be realized not only in software, but also in hardware, for example, in logic circuitry, analog circuitry, or combinations thereof.

The regulation recognizer 55 is configured to recognize regulatory information displayed on a road sign disposed external to the own vehicle from an image captured by the imaging unit 10.

The regulatory information refers to information indicative of a restriction on travel of the own vehicle including, but are not limited to, speed limits, maximum speeds, lower speed limits, weight limits, length limits, closure, no-entry, one-way traffic, no entry except indicated direction. The road signs on which the regulatory information is displayed may be classified as regulatory signs.

The regulation recognizer 55 is configured to use a well-known image recognition technique, such as pattern matching, to recognize a road sign on which the regulatory information is displayed based on a captured image acquired from the imaging unit 10. A display and a shape of the road sign uniquely represents the regulation. Therefore, recognition of the road sign allows the regulation indicated by the regulatory information displayed on the road sign to be recognized.

The regulation recognizer 55 may be configured to acquire regulatory information associated with a road sign from a terminal (not shown) having map information, such as a navigator or a smart phone, and recognize the regulation indicated by the regulatory information associated with the road sign. The regulatory information acquired from the map information may be used to supplement the regulatory information acquired from the captured image.

The condition recognizer 56 is configured to recognize conditional information displayed on the road sign disposed external to the own vehicle from an image captured by the imaging unit 10.

The conditional information refers to information indicative of a condition under which the regulation is to be applied, where the condition is an environmental condition about an environment around the own vehicle. The environmental condition refers to a condition regarding conditions outside the own vehicles may include a road condition, such as a wet or icy road condition, a weather condition, an ambient light condition, the presence or absence of other vehicles or obstacles located outside the own vehicle, a road shape, and other various conditions outside the own vehicle.

The conditional information may be displayed on a road sign disposed alongside of another road sign on which the regulatory information is displayed or may be displayed alongside of the regulatory information on the same road sign on which the regulation information is displayed. In the former case where the conditional information is displayed on a road sign disposed alongside of another road sign on which the regulatory information is displayed, the road sign on which the regulatory information is displayed may be classified as a regulatory sign, and the road sign on which the conditional information is displayed may be classified as a supplemental sign.

The condition recognizer 56 is configured to use a well-known image recognition technique, such as pattern matching, to recognize a road sign on which the conditional information is displayed based on a captured image acquired from the imaging unit 10. A display and a shape of the road sign uniquely represents the environmental condition indicated by the conditional information. Therefore, recognition of the road sign allows the environmental condition indicated by the conditional information displayed on the road sign to be recognized. The condition recognizer 56 may be configured to acquire information about a road sign from a terminal (not shown) having map information, such as a navigator or a smart phone, and based on the acquired information, recognize the environmental condition indicated by the conditional information under which the regulation recognized by the regulation recognizer 55 is to be applied. The conditional information thus acquired from the map information may be used to supplement the conditional information acquired from the captured image.

The road sign on which the regulatory information is displayed corresponds to a first indicator. The road sign on which the conditional information is displayed corresponds to a second indicator. As used herein, the term "indicator" refers to an object disposed external to the own vehicle and along the traveled road that the own vehicle is traveling on, which is characterized by features that include, but are not limited to, an externally visible shape, a pattern, characters, and a design.

The indicators other than the road signs may include a signboard that may be disposed at a variable location, and an image display apparatus disposed near the traveled road such that the regulatory information and the conditional information displayed on the image display apparatus can be recognized from an image captured by the imaging unit 10.

The environment recognizer 57 is configured to recognize an environment around the own vehicle based on a captured image acquired from the imaging unit 10. A specific technique for recognizing the environment will be described latter. The output controller 58 is configured to perform a first control and a second control that are based on the regulatory information.

In the first control, the output controller 58 causes the display unit 20 and the audio output unit 30 to notify the driver of the own vehicle of information regarding the regulatory information recognized by the regulation recognizer 55.

The output controller 58 is configured to turn on and off an environment flag in response to whether or not the environment around the own vehicle recognized by the environment recognizer 57 satisfies the environmental condition indicated by the conditional information recognized by the condition recognizer 56. The output controller 58 causes the display unit 20 and the audio output unit 30 to perform different notification operations depending on whether the environment flag is on or off.

If the environment around the own vehicle satisfies the environmental condition, then the environment flag is set on. Otherwise, the environment flag is set off. The environment flags may include a wet-road flag, a rainfall flag, an icy-road flag, a general-vehicle flag, and a nighttime flag. In the following, the term "environment flag" refers to one of these flags.

The second control is the automated cruise control. In the automated cruise control, the output controller 58 controls steering and the speed of the own vehicle so as to enable the cruise control to be performed without any driver's operations.

The output controller 58 is configured to determine a lane that the own vehicle should travel on, a travel route, a travel speed and others, based on information about lane partition lines, other vehicles, traffic lights acquired from the imaging unit 10 and various radar devices, destination information entered by a passenger via a navigation device (not shown), and information indicated by road signs including at least the regulatory information, acquired from the external to the own vehicle or the map information and displayed on the road sign.

For example, if a preceding vehicle travelling at a lower speed than the own vehicle is detected, the output controller 58 determines to perform a lane change and determine a specific vehicle behavior to achieve the lane change. The output controller 58 outputs control signals for performing the determined specific vehicle behavior to the acceleration and deceleration unit 60 and the steering unit 70. The acceleration and deceleration unit 60 and the steering unit 70 drives the own vehicle in response to the control signals.

The regulatory information recognized by the regulation recognizer such that the environment around the own vehicle satisfies the environmental condition under which the regulation indicated by the regulatory information is to be applied is stored in the memory 52. The automated cruise control is performed with reference to the regulatory information stored in the memory 52. If the road that the own vehicle is traveling on has been changed or if the environment around the own vehicle no longer satisfies the environmental condition, the regulatory information accompanied by the environmental condition may be removed from the memory 52 or no reference may be made to the regulatory information.

Examples of Regulation Information and Condition Information

FIGS. 2-6 illustrate examples of regulatory information and conditional information displayed on road signs arranged one on top of the other.

Figure 2:
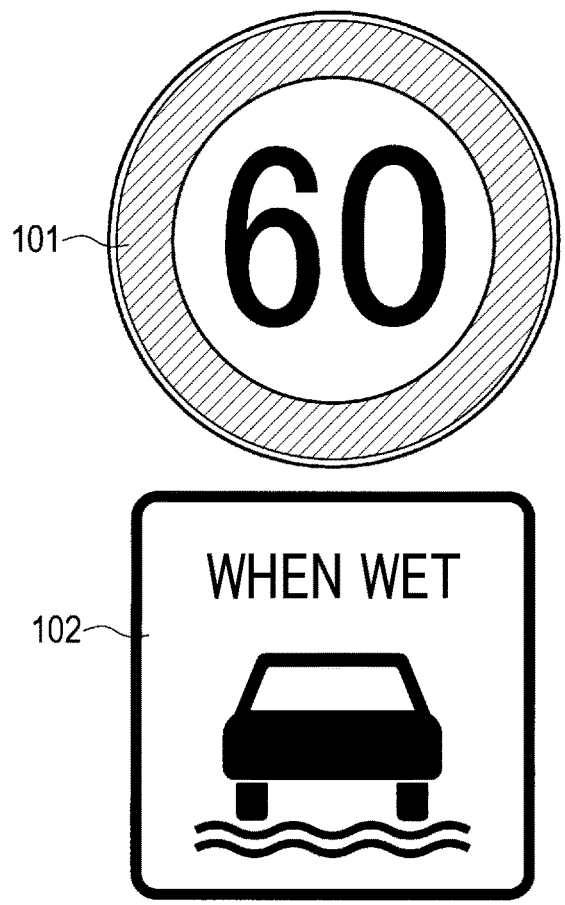
FIG. 2 is an example of regulatory information and conditional information.

In FIG. 2, a speed limit of 60 km/h, as the regulatory information, is displayed on a road sign 101. A combination of a symbol and characters indicative of an environmental condition that the road surface is wet, as the conditional information, is displayed on a road sign 102. The road sign 101 corresponds to a first indicator, and the road sign 102 corresponds to a second indicator.

The environment recognizer 57 recognizes wetness of the road surface from the image captured by the imaging unit 10. The environment recognizer 57 may look for a road reflection of headlights of a vehicle travelling on an oncoming lane. If the road reflection is detected, the environment recognizer 57 determines that the road surface is wet. Alternatively, the environment recognizer 57 may recognize the wetness of the road surface in any other well-known manner.

If it is determined by the environment recognizer 57 that the road surface is wet, the output controller 58 turns on the wet-road flag. If it is determined by the environment recognizer 57 that the road surface is not wet, the output controller 58 turns off the wet-road flag. If the travel speed of the own vehicle exceeds 60 km/h while the wet-road flag is on, the output controller 58 causes the display unit 20 to display "over-speeding" and further causes the audio output unit 30 to generate an audible output "the speed limit is 60 km/h".

If the wet-road flag is on, the output controller 58 references the regulatory information during the automated cruise control. If the travel speed of the own vehicle exceeds 60 km/h, the output controller 58 may cause the acceleration and deceleration unit 60 to perform the deceleration control to reduce the travel speed to 60 km/h or lower. Alternatively, if the travel speed of the own vehicle exceeds 60 km/h, the output controller 58 may cause the display unit 20 and the audio output unit 30 to perform the notification operations and thereafter cause the acceleration and deceleration unit 60 to perform the deceleration control to reduce the travel speed to 60 km/h or lower.

If the wet-road flag is off, the output controller 58 inhibits the display unit 20 and the audio output unit 30 from performing the notification operations and does not reference the regulatory information during the automated cruise control. Alternatively, given a threshold defined such that, if the travel speed exceeds the threshold, the output controller 58 causes the display unit 20 and the audio output unit 30 to perform the notification operations, the threshold may be changed if the wet-road flag is off. For example, if the wet-road flag is off, the threshold may be changed from 60 km/h to 80 km/h.

Figure 3:
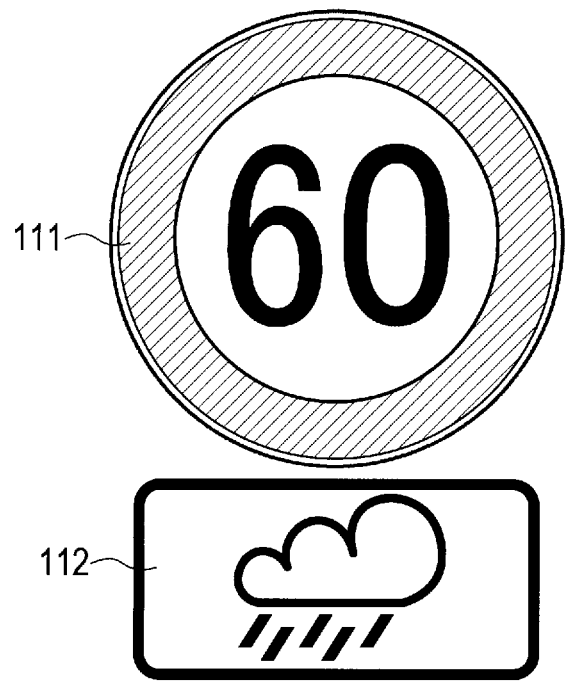
FIG. 3 is an example of regulatory information and conditional information.

In FIG. 3, a speed limit of 60 km/h, as the regulatory information, is displayed on a road sign 111. A symbol indicative of an environmental condition that it is raining, as the conditional information, is displayed on a road sign 112. The road sign 111 corresponds to a first indicator, and the road sign 112 corresponds to a second indicator.

The environment recognizer 57 recognizes the presence or absence of rainfall from the image captured by the imaging unit 10. The environment recognizer 57 may look for rain drops deposited on a windshield of the own vehicle. If rain drops are detected, the environment recognizer 57 determines that it is raining. Alternatively, the environment recognizer 57 may recognize the presence or absence of rainfall from the captured image in any other well-known manner.

If it is determined by the environment recognizer 57 that it is raining, the output controller 58 turns on the rainfall flag. If it is determined by the environment recognizer 57 that it is not raining, the output controller 58 turns off the rainfall flag. If the travel speed of the own vehicle exceeds 60 km/h while the rainfall flag is on, the output controller 58 causes the display unit 20 to display "over-speeding" and further causes the audio output unit 30 to generate an audible output "the speed limit is 60 km/h".

If the rainfall flag is on, the output controller 58 references the regulatory information during the automated cruise control. If the travel speed of the own vehicle exceeds 60 km/h, the output controller 58 may cause the acceleration and deceleration unit 60 to perform the deceleration control to reduce the travel speed to 60 km/h or lower. Alternatively, if the travel speed of the own vehicle exceeds 60 km/h, the output controller 58 may cause the display unit 20 and the audio output unit 30 to perform the notification operations and thereafter cause the acceleration and deceleration unit 60 to perform the deceleration control to reduce the travel speed to 60 km/h or lower.

If the rainfall flag is off, the output controller 58 inhibits the display unit 20 and the audio output unit 30 from performing the notification operations and does not reference the regulatory information during the automated cruise control. Alternatively, given a threshold defined such that, if the travel speed exceeds the threshold, the output controller 58 causes the display unit 20 and the audio output unit 30 to perform the notification operations, the threshold may be changed if the rainfall flag is off.

Figure 4:
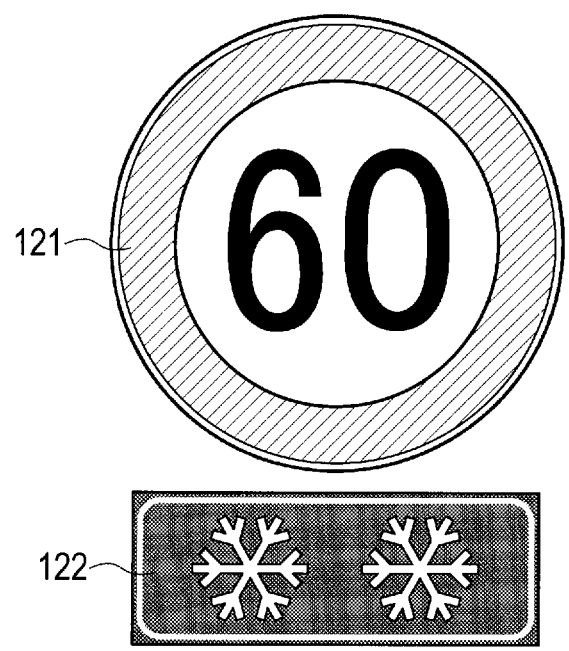
FIG. 4 is an example of regulatory information and conditional information.

In FIG. 4, a speed limit of 60 km/h, as the regulatory information, is displayed on a road sign 121. A symbol indicative of an environmental condition that the road surface may be icy, as the conditional information, is displayed on a road sign 122. The road sign 121 corresponds to a first indicator, and the road sign 122 corresponds to a second indicator.

The environment recognizer 57 recognizes whether or not the road surface may be icy from the image captured by the imaging unit 10. The environment recognizer 57 may calculate the percentage of white pixels that lie outside white lines. If the percentage of white pixels that lie outside white lines is equal to or greater than a predetermined threshold, the environment recognizer 57 determines that the road surface may be icy. Alternatively, the environment recognizer 57 may recognize whether or not the road surface may be icy from the captured image in any other well-known manner.

If it is determined by the environment recognizer 57 that the road surface may be icy, the output controller 58 turns on the icy-road flag. If it is not determined by the environment recognizer 57 that the road surface may be icy, the output controller 58 turns off the icy-road flag. If the travel speed of the own vehicle exceeds 60 km/h while the icy-road flag is on, the output controller 58 causes the display unit 20 to display "over-speeding" and further causes the audio output unit 30 to generate an audible output "the speed limit is 60 km/h".

If the icy-road flag is on, the output controller 58 references the regulatory information during the automated cruise control. If the travel speed of the own vehicle exceeds 60 km/h, the output controller 58 may cause the acceleration and deceleration unit 60 to perform the deceleration control to reduce the travel speed to 60 km/h or lower. Alternatively, if the travel speed of the own vehicle exceeds 60 km/h, the output controller 58 may inhibit an abrupt change in engine power and switch to a driving mode in which wheel slip is less prone to occur. Still alternatively, if the travel speed of the own vehicle exceeds 60 km/h, the output controller 58 may cause the display unit 20 and the audio output unit 30 to perform the notification operations and thereafter cause the acceleration and deceleration unit 60 to perform the deceleration control to reduce the travel speed to 60 km/h or lower.

If the icy-road flag is off, the output controller 58 inhibits the display unit 20 and the audio output unit 30 from performing the notification operations and does not reference the regulatory information during the automated cruise control. Alternatively, given a threshold defined such that, if the travel speed exceeds the threshold, the output controller 58 causes the display unit 20 and the audio output unit 30 to perform the notification operations, the threshold may be changed if the icy-road flag is off.

Figure 5:
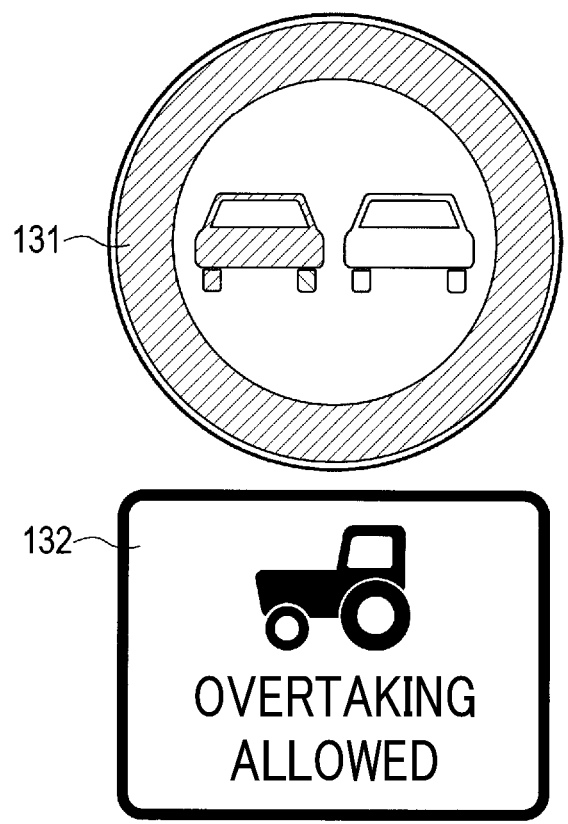
FIG. 5 is an example of regulatory information and conditional information.

In FIG. 5, a symbol indicative of no overtaking, as the regulatory information, is displayed on a road sign 131. A combination of a symbol and characters "Tractor may be overtaken" indicative of an environmental condition that overtaking a tractor is allowed, as the conditional information, is displayed on a road sign 132. That is, the conditional information indicates that the own vehicle must not overtake any preceding vehicle other than the tractor. The road sign 131 corresponds to a first indicator, and the road sign 132 corresponds to a second indicator.

The environment recognizer 57 recognizes whether or not a preceding vehicle traveling ahead of the own vehicle is a tractor from the image captured by the imaging unit 10. Recognition of the tractor may be performed using well-known pattern matching. Alternatively, the environment recognizer 57 may recognize whether or not a preceding vehicle traveling ahead of the own vehicle is a tractor from the image in any other well-known manner.

If it is determined by the environment recognizer 57 that the preceding vehicle traveling ahead of the own vehicle is not a tractor, the output controller 58 turns on the general-vehicle flag and causes the display unit 20 to display "no overtaking".

If the general-vehicle flag is on, the output controller 58 references the regulatory information during the automated cruise control. That is, during the automated cruise control, if a preceding vehicle travelling ahead of the own vehicle is not a tractor, overtaking the preceding vehicle is inhibited. Therefore, if the preceding vehicle is traveling at a travel speed lower than that of the own vehicle, the output controller 58 may cause the acceleration and deceleration unit 60 to perform the deceleration control in order to adjust the travel speed of the own vehicle so as to match the travel speed of the preceding vehicle. Alternatively, if a preceding vehicle traveling ahead of the own vehicle is not a tractor, the output controller 58 may cause the display unit 20 and the audio output unit 30 to perform the notification operations and thereafter cause the acceleration and deceleration unit 60 to perform the deceleration control.

The indication of "no overtaking" may be displayed not only if it is determined that the preceding vehicle traveling ahead of the own vehicle is not a tractor, but also if an additional condition is met. The additional condition may be that the own vehicle has approached the preceding vehicle so that a distance therebetween becomes less than a predetermined distance, or may be that the own vehicle is rapidly approaching the preceding vehicle. Alternatively or additionally, if it is determined that the preceding vehicle traveling ahead of the own vehicle is not a tractor and if such an additional condition is met, the output controller 58 may cause the audio output unit 30 to generate an audible output "no overtaking". The distance between the own vehicle and the preceding vehicle and recognition of approach may be detected from the image captured by the imaging unit 10. Alternatively, the distance between the own vehicle and the preceding vehicle and recognition of approach may be detected using an infrared laser or a millimeter-wave radar.

If it is determined by the environment recognizer 57 that the preceding vehicle traveling ahead of the own vehicle is a tractor, the output controller 58 turns off the general-vehicle flag and causes the display unit 20 to display a thumbnail of "overtaking allowed". Alternatively, if the general-vehicle flag is off, the output controller 58 may cause the display unit 20 and the audio output unit 30 to perform the notification operations.

If the general-vehicle flag is off, that is, if it is determined that a preceding vehicle traveling ahead of the own vehicle is a tractor, overtaking the preceding vehicle is allowed. Therefore, the automated cruise control may be performed to overtake the preceding vehicle that is a tractor. During the automated cruise control, the output controller 58 may output a control signal to the steering unit 70 for setting a tire turning angle of the own vehicle to make a lane change, output a control signal to the acceleration and deceleration unit 60 for performing the acceleration control to increase the travel speed of the own vehicle, and output a control signal to the steering unit 70 for setting a tire turning angle of the own vehicle to make another lane change to the original lane. Alternatively, if the general-vehicle flag is off, the output controller 58 may cause the display unit 20 and the audio output unit 30 to perform the notification operations and thereafter cause the acceleration and deceleration unit 60 and the steering unit 70 to perform driving control to overtake the preceding vehicle, i.e., a tractor.

Figure 6:
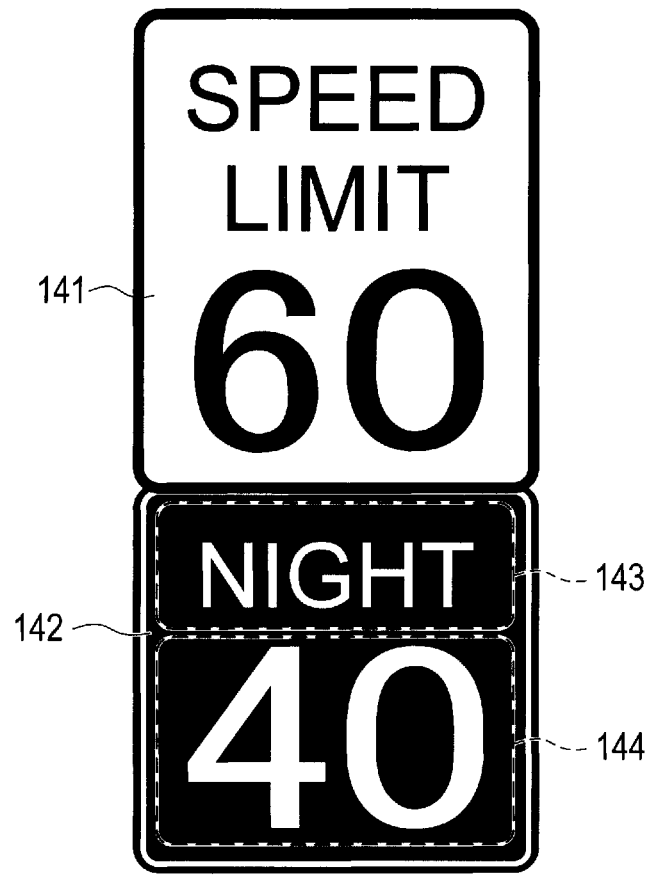
FIG. 6 is an example of regulatory information and conditional information.

In FIG. 6, a speed limit of 60 km/h is displayed on a road sign 141. A speed limit of 40 km/h at night is displayed on a road sign 142. The characters "40" in the lower part 144 of the road sign 142 corresponds to the regulatory information. The characters "NIGHT" in the upper part 143 of the road sign 142 indicative of an environmental condition that it is nighttime corresponds to the regulatory information.

The road sign 142 corresponds to first and second indicators integrated with each other. In this example, the environment recognizer 57 recognizes whether or not it is nighttime from the image captured by the imaging unit 10. More specifically, the environment recognizer 57 may recognize whether it is daytime or nighttime based on the sky brightness in the captured image. Alternatively, the environment recognizer 57 may recognize whether it is daytime or nighttime in any other well-known manner.

If it is determined by the environment recognizer 57 that it is nighttime, the output controller 58 turns on the nighttime flag. If it is not determined by the environment recognizer 57 that it is nighttime or if it is determined by the environment recognizer 57 that it is daytime, the output controller 58 turns off the nighttime flag. If the travel speed of the own vehicle exceeds 40 km/h while the nighttime flag is on, the output controller 58 causes the display unit 20 to display "over-speeding" and further causes the audio output unit 30 to generate an audible output "the speed limit is 40 km/h".

If the nighttime flag is on, the output controller 58 performs the automated cruise control with the speed limit of 40 km/h. Still alternatively, if the nighttime flag is on, the output controller 58 may cause the display unit 20 and the audio output unit 30 to perform the notification operations and thereafter perform automated cruise control.

If the travel speed of the own vehicle exceeds 60 km/h while the nighttime flag is off, the output controller 58 causes the display unit 20 to display "over-speeding" and further causes the audio output unit 30 to generate an audible output "the speed limit is 60 km/h". The output controller 58 performs the automated cruise control with the speed limit of 60 km/h.

Processing

Processing to be performed in the information processing apparatus 50 will now be described. Notification processing performed under the first control of the output controller 58 will be described with reference to a flowchart of FIG. 7. This processing is performed every predetermined time interval while an accessory power source (not shown) is on.

In step S1, the regulation recognizer 55 recognizes regulatory information from an image captured by the imaging unit 10. More specifically, as described above, the regulation recognizer 55 detects a road sign on which regulatory information is displayed via pattern matching and recognizes the regulatory information displayed on the road sign.

In step S2, the condition recognizer 56 recognizes conditional information from the image captured by the imaging unit 10. More specifically, as described above, the condition recognizer 56 detects a road sign on which conditional information is displayed via pattern matching and recognizes the conditional information displayed on the road sign.

Association of the recognized regulatory information with the recognized conditional information is established based on a positional relationship between the road sign on which regulatory information is displayed and the road sign on which conditional information is displayed, except when the recognized regulatory information and the recognized conditional information are displayed on the same road sign.

More specifically, if a road sign disposed in proximity to the recognized road sign on which regulatory information is displayed, particularly, beneath the road sign on which the regulatory information is displayed, is recognized as displaying conditional information, then the conditional information is determined to indicate an environmental condition under which the regulation indicated by the regulatory information is to be applied.

Alternatively, if the recognized road sign on which conditional information is displayed is positioned laterally or vertically adjacent to the recognized road sign on which regulatory information is displayed, the regulatory information and the conditional information may be associated with each other.

The regulatory information recognized in step S1 and the conditional information recognized in step S2 may be supplemented by information acquired from a terminal having map information (not shown), such as a navigation device or a smart phone.

In step S3, the environment recognizer 57 recognizes an environment around the own vehicle from the image captured by the imaging unit 10. In step S4, the output controller 58 determines whether or not the environment around the own vehicle recognized by the environment recognizer 57 in step S3 satisfies an environmental condition indicated by the conditional information recognized in step S2. If in step S4 it is determined that the environment around the own vehicle satisfies the environmental condition, then the process flow proceeds to step S5. If in step S4 it is not determined that the environment around the own vehicle satisfies the environmental condition, then the process flow proceeds to step S6.

In step S5, the output controller 58 turns on the environment flag for the environmental condition determined to be met in step S4. Thereafter, the process flow proceeds to step S7. In step S6, the output controller 58 turns off the environment flag for the environmental condition not determined to be met in step S4. Thereafter, the process flow proceeds to step S7.

In step S7, the output controller 58 detects a travel state of the own vehicle. Based on the detected travel state of the own vehicle, it is determined whether or not the own vehicle is in violation of the regulation indicated by the regulatory information displayed on the road sign or whether or not the regulation indicated by the regulatory information displayed on the road sign is increasingly more likely to be violated.

For example, a travel speed of the own vehicle, as a travel state of the own vehicle, may be detected to determine whether or not the own vehicle is in violation of a speed limit. At least one of a distance between the preceding vehicle and the own vehicle and a speed at which the own vehicle is approaching the preceding vehicle, as a travel state of the own vehicle, may be detected to determine whether or not the own vehicle is likely to overtake a preceding vehicle in a no overtaking section.

The travel states are not limited to the above ones corresponding to the road signs shown in FIGS. 2-6. For example, another travel state of the own vehicle to determine whether or not the own vehicle is in violation of no entry except indicated direction or no parking as a regulation may include not only a travel speed, but also a steering angle, a state of blinkers, a brake actuation amount, or an integrated rotation amount of the own vehicle about its vertical axis.

In step S8, the output controller 58 causes the display unit 20 and the audio output unit 30 to perform the notification operations. The notifications respectively provided by the display unit 20 and the audio output unit 30 are specifically determined based on whether the environment flag is on or off and the travel state detected in step S7.

As an example, under assumption that the road sign 101 and the road sign 102 as shown in FIG. 2 have been detected in steps S1 and S2, if the travel speed is above 60 km/h and if the wet-road flag is on, the output controller 58 causes the display unit 20 and the audio output unit 30 to perform the notification operations. If the travel speed is below 60 km/h and if the wet-road flag is off, the output controller 58 inhibits the display unit 20 and the audio output unit 30 from performing the notification operations.

As another example, under assumption that the road sign 131 and the road sign 132 as shown in FIG. 5 have been detected in steps S1 and S2, if the own vehicle is likely to overtake a preceding vehicle traveling ahead of the own vehicle and if the general-vehicle flag is on, the output controller 58 causes the display unit 20 and the audio output unit 30 to perform the notification operations. If the own vehicle has approached the preceding vehicle so that a distance therebetween becomes less than a predetermined distance or if the own vehicle is rapidly approaching the preceding vehicle at a predetermined approaching speed or higher, it is determined that the own vehicle is likely to overtake a preceding vehicle.

If the own vehicle is less likely to overtake a preceding vehicle traveling ahead of the own vehicle or if the general-vehicle flag is off, the output controller 58 inhibits the display unit 20 and the audio output unit 30 from performing the notification operations. As another example, under assumption that the road sign 141 and the road sign 142 as shown in FIG. 6 have been detected in steps S1 and S2, if the nighttime flag is on and if the travel speed of own vehicle is above 40 km/h, the output controller 58 causes the display unit 20 and the audio output unit 30 to perform the notification operations. If the nighttime flag is on and if the travel speed of own vehicle is 40 km/h or below, the output controller 58 inhibits the display unit 20 and the audio output unit 30 from performing the notification operations.

If the nighttime flag is off and if the travel speed of own vehicle is above 60 km/h, the output controller 58 causes the display unit 20 and the audio output unit 30 to perform the notification operations. If the nighttime flag is off and if the travel speed of own vehicle is 60 km/h or below, the output controller 58 inhibits the display unit 20 and the audio output unit 30 from performing the notification operations.

After step S8, the process flow ends.

Figure 8:
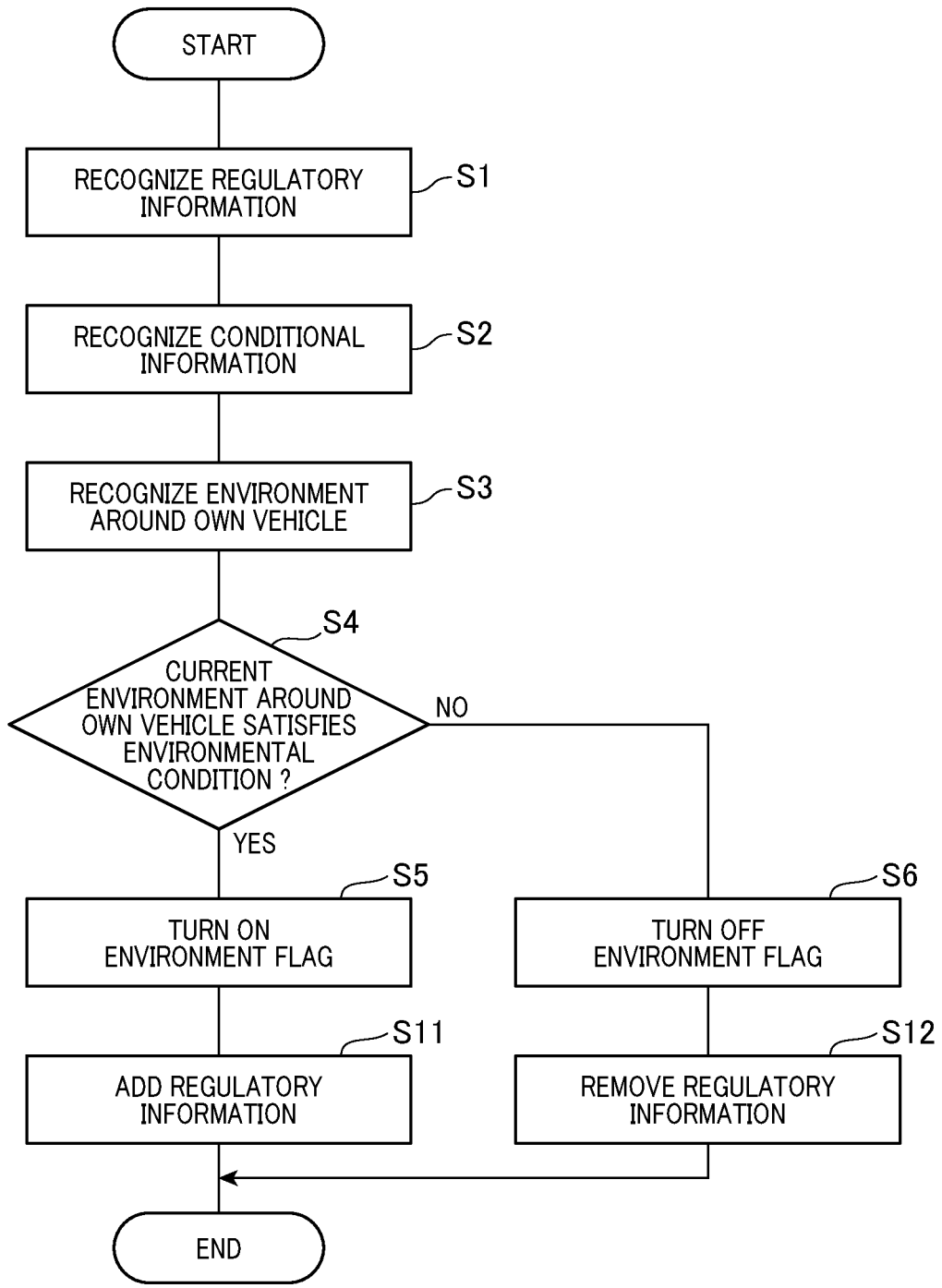
FIG. 8 is a flowchart of regulatory information setup processing.

Regulatory information setup processing to setup the regulatory information to be referenced by the output controller 58 during the automated cruise control will now be described with reference to a flowchart of FIG. 8. This processing is initiated at the same time the automated cruise control is initiated and is repeatedly performed every predetermined time interval during the automated cruise control. This processing is referred to as regulatory information setup processing.

Figure 7:
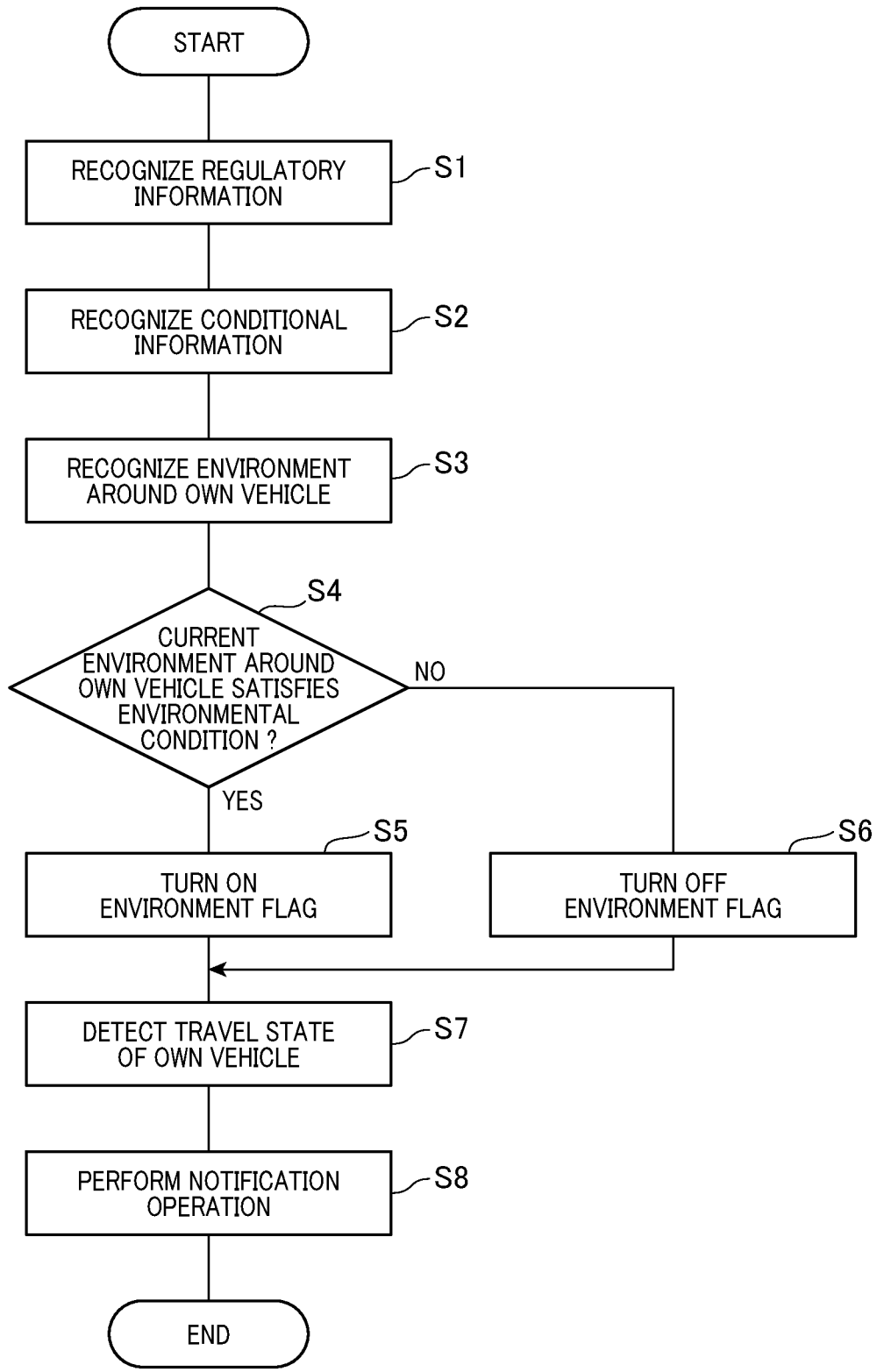
FIG. 7 is a flowchart of notification processing.

Steps S1-S6 of this processing are similar to steps S1-S6 shown in FIG. 7. Therefore, description of these steps is omitted.

After step S5, the process flow proceeds to step S11. In step S11, the output controller 58 adds the regulatory information recognized in step S1 to the regulatory information stored in the memory 52 to be referenced by the output controller 58 during the automated cruise control. Thereafter, the process flow ends.

After step S6, the process flow proceeds to step S12. In step S12, the output controller 58 removes the regulatory information recognized in step S1 from the regulatory information stored in the memory 52 to be referenced by the output controller 58 during the automated cruise control. Thereafter, the process flow ends.

Advantages

The embodiment described above can provide the following advantages.

(1A) The information processing system 1 according to the present embodiment is configured to, based on a captured image, recognize conditional information indicative of an environmental condition, and based on the captured image, recognize an environment around the own vehicle.

This configuration allows the information processing system 1 to determine whether or not the environment around the own vehicle satisfies the environmental condition based only on the image captured by the imaging unit 10. Therefore, the information processing system 1 is able to recognize an environment around the own vehicle without requiring sensors other than the imaging unit 10 and perform appropriate notification operations to the driver of the own vehicle.

Even if the information processing system 1 is equipped with sensors that can recognize an environment around the own vehicle, no use of such sensors in the information processing system 1 can also prevent complication of the whole system.

Such sensors may be used together with the imaging unit 10 in the information processing system, which may increase the accuracy of environment recognition by combing the environment around the own vehicle acquired from the captured image and information acquired from such sensors. Even in the presence of needs for increased environmental recognition accuracy, using the imaging unit 10 as one of sensors to recognize an environment around the own vehicle may also prevent complication of the overall configuration of the information processing system 1.

Further, using such sensors to detect information that cannot be acquired from the captured image allows more information about an environment around the own vehicle.

(1B) The information processing system 1 according to the present embodiment is configured to, based not only on whether or not an environmental condition is met, but also on whether or not a travel state is in violation of a regulation, determine whether or not a notification to the driver of the own vehicle is needed. Therefore, if a notification to the driver of the own vehicle is needed, the information processing system 1 is allowed to provide the notification to the driver of the own vehicle. If no notification to the driver of the own vehicle is needed, the information processing system 1 provides no notification to the driver of the own vehicle. Therefore, this configuration allows the driver to recognize the regulation if a notification to the driver of the own vehicle is needed, and can reduce the risk that the driver would mistakenly recognize the regulation if no notification to the driver of the own vehicle is needed.

(1C) The information processing system 1 according to the present embodiment is configured to, during the, automated cruise control, recognize an environment around the own vehicle based on the captured image and reference correct regulatory information.

Therefore, this configuration enables proper automated cruise control without requiring sensors other than the imaging unit 10.

Modifications

It is to be understood that the invention is not to be limited to the specific embodiment disclosed above and that modifications and other embodiments are intended to be included within the scope of the appended claims.

(2A) In the above embodiment, the speed limit and no overtaking regulations are merely examples of the regulation indicated by the regulatory information recognized in step S1 shown in FIG. 7. Alternatively, the regulatory information may indicate another regulation.

(2B) In the above embodiment, a wet or icy road condition, a weather condition, an ambient light condition, and a type of the preceding vehicle are examples of the environmental condition indicated by the conditional information recognized in step S2 shown in FIG. 7. Alternatively, the conditional information may indicate another environmental condition.

(2C) In the above embodiment, supposing that one of the road signs as shown in FIGS. 2-4 has been detected, a notification is provided to the driver of the own vehicle if an environment around the own vehicle satisfies the environmental condition and if the travel state of the own vehicle is in violation of the regulation indicated by the regulatory information. Alternatively, regardless of the travel state of the own vehicle, a notification may be provided to the driver of the own vehicle if the environmental condition is met.

More specifically, supposing that the road sign shown in FIG. 2 has been recognized, if the wet-road flag is on, the output controller 58 may cause the display unit 20 to display "the speed limit is 60 km/h" with large characters and cause the audio output unit 30 to generate an audible output "the speed limit is 60 km/h". If the wet-road flag is off, the output controller 58 may cause the display unit 20 to display "the speed limit is 60 km/h when the road surface is wet" with small characters.

Such a configuration of the information processing system 1 can also provide proper information to the driver of the own vehicle while preventing complication of the system and misrecognition of regulations.

(2D) In the above embodiment, aspects of the notification operations to be performed by the display unit 20 and the audio output unit 30 may be changed with whether or not the environmental condition is met. More specifically, the display unit 20 and the audio output unit 30 may perform the notification operations if the environmental condition is met, and may perform no notification operations if the environmental condition is not met.

Alternatively, for example, the notifications provided by the display unit 20 and the audio output unit 30 may be clarified to a degree depending on whether or not the environmental condition is met. More specifically, if notification needs are high, the display unit 20 may display an image brighter, bigger, or at a position convenient for viewing, and the audio output unit 30 may generate a loud audible output.

(2E) In the above embodiment, the regulatory information, the conditional information, and the environment around the own vehicle are recognized based on an image captured by the single imaging unit 10. Alternatively, the regulatory information, the conditional information, and the environment around the own vehicle may be recognized based on images captured by a plurality of imaging units. In such a configuration, the plurality of imaging units may be positioned to look in different directions, or may be positioned to capture images of the same area or adjacent areas.

Still alliteratively, a camera configured to capture images of the same object from plural positions, such as a stereoscopic camera, may be used. However, if the information processing system 1 is configured to detect information, such as the regulatory information and the environmental condition, using one of the imaging units having an imaging sensor, as in the above embodiment, the information processing system 1 may be more simplified in configuration.

(2F) In the above embodiment, to notify the driver of the own vehicle of information regarding the regulatory information, the display unit 20 displays that the travel state of the own vehicle is in violation of the regulation indicated by the regulatory information and the audio output unit 30 provides the content of the regulatory information by an audible output. However, various units may be used to notify the driver of various types of information regarding the regulatory information.

For example, the display unit 20 may be configured to display the image indicating the recognized regulatory information itself, as information regarding the regulatory information. The image displayed on the display unit 20 may include a road sign image pre-stored in the memory 52, or an image area cut out from the image captured by the imaging unit 10, where the road sign appears. Alternatively, a text indicative of the content of the regulatory information may be displayed on the display unit 20, as information regarding the regulatory information.

The audio output unit 30 may be configured to generate an audible output indicating that the travel state of the own vehicle is in violation of the regulation indicated by the regulatory information. Still alternatively, either one of the display unit 20 and the audio output unit 30 may be used to perform the notification operations.

(2G) In the above embodiment, the road signs are examples of the first and second indicators, where the regulatory information is indicated on the first indicator and the conditional information is indicated on the second indicator. Alternatively, the regulatory information and the conditional information may be indicated on any other indicators than the road signs.

(2H) In the above embodiment, during the automated cruise control, the output controller 58 controls the steering and the speed of the own vehicle to continue the cruise without requiring the driver's operations, where the recognized regulatory information is referenced during the automated cruise control. Alternatively, during the automated cruise control, only some of driving operations may be performed by the driver of the own vehicle. For example, the output controller 58 may only control the acceleration and deceleration unit 60, and the driver may perform steering of the own vehicle, where the control of the output controller 58 may be performed based on the recognized regulatory information.

(2I) In the above embodiment, the output generator 80 for providing prescribed outputs includes the display unit 20, the audio output unit 30, the acceleration and deceleration unit 60, and the steering unit 70, where these units are controlled by the output controller 58. Alternatively, the output generator may include, but not limited to these units, other various units that can generate outputs in response to the recognized regulatory information as the prescribed outputs.

(2J) The information processing apparatus 50 may be external to the own vehicle. When wired to or wirelessly connected to other elements within the own vehicle, the information processing apparatus 50 can function as the information processing system 1.

The information processing apparatus 50 may be distributed over a plurality of hardware components.

(2K) The functions of a single component may be distributed to a plurality of components, or the functions of a plurality of components may be integrated into a single component. At least part of the configuration of the above embodiments may be replaced with a known configuration having a similar function. At least part of the configuration of the above embodiments may be removed. At least part of the configuration of one of the above embodiments may be replaced with or added to the configuration of another one of the above embodiments. While only certain features of the invention have been illustrated and described herein, many modifications and changes will occur to those skilled in the art. It is, therefore, to be understood that the appended claims are intended to cover all such modifications and changes as falling within the true spirit of the invention.

(2L) It should be appreciated that the invention is not to be limited to the information processing system 1 and that the present invention can be implemented in numerous ways, including the information processing apparatus 50 as a component of the information processing system 1, a program for enabling a computer to function as the information processing apparatus 50, a non-transitory computer readable storage medium storing such a program, and an output control method.

What is claimed is:

1. An information processing system comprising:
    an imager adapted to capture an image of the outside of a vehicle;
    a non-transitory memory storing one or more computer programs;
    a processor executing the one or more computer programs to:
    recognize regulatory information displayed on a first indicator disposed external to the vehicle from a capture image, the regulatory information being information indicative of a regulation on travel of the vehicle;
    recognize conditional information displayed on a second indicator disposed external to the vehicle from the captured image, the conditional information being indicative of a condition under which the regulation indicated by the regulatory information is to be applied, the condition being an environmental condition about an environment around the vehicle, the environmental condition including at least one of a road condition, a weather condition, an ambient light condition, and a type of a preceding vehicle;
    recognize the environment around the vehicle relating to the environmental condition from the captured image;
    generate prescribed outputs; and
    control the prescribed outputs generated and further, in response to the environment recognized around the vehicle satisfying the environmental condition indicated by the conditional information recognized, control generating the prescribed outputs based on the regulatory information.

2. The system according to claim 1, wherein the processor further executes one or more computer programs to control output of different outputs depending on whether or not a travel state of the vehicle is in violation of the regulation indicated by the regulatory information.

3. The system according to claim 1, wherein
    the processor further executes one or more computer programs to generate notifications to notify a driver of the vehicle of information regarding the regulatory information, and
    cause to generate different notifications depending on whether or not the environment recognized around the vehicle satisfies the environmental condition indicated by the recognized conditional information recognized.

4. The system according to claim 3, wherein, in response to the environment recognized around the vehicle not satisfying the environmental condition indicated by the conditional information recognized, inhibit generating the notifications.

5. The system according to claim 1, wherein the processor further executes one or more computer programs to generate outputs for controlling travel of the vehicle.

6. The system according to claim 1, wherein the processor further executes one or more computer programs to recognize the environmental condition indicated by the conditional information displayed on the second indicator disposed in proximity to the first indicator as an environmental condition under which the regulation indicated by the regulatory information displayed on the first indicator is to be applied.

7. The system according to claim 1, wherein
    the first indicator and the second indicator are the same indicator,
    the processor further executes one or more computer programs to recognize the regulatory information from the same indicator, and
    recognize the conditional information from the same indicator.

8. An information processing apparatus comprising:
    a non-transitory memory storing one or more computer programs;
    a processor executing the one or more computer programs to:
    recognize regulatory information displayed on a first indicator disposed external to a vehicle from a captured image of the outside of the vehicle, the regulatory information being information indicative of a regulation on travel of the vehicle;
    recognize conditional information displayed on a second indicator disposed external to the vehicle from the captured image, the conditional information being information indicative of a condition under which the regulation indicated by the regulatory information recognized is to be applied, the condition being an environmental condition about an environment around the vehicle, the environmental condition including at least one of a road condition, a weather condition, an ambient light condition, and a type of a preceding vehicle;
    recognize the environment around the vehicle relating to the environmental condition from the captured image; and
    generate an output, in response to the environment recognized around the vehicle satisfying the environmental condition indicated by the conditional information recognized, and control the output based on the regulatory.

9. A method of controlling generating prescribed outputs, the method comprising:
    recognizing, from an image captured outside of a vehicle, (i) regulatory information displayed on a first indicator disposed external to the vehicle, the regulatory information being information indicative of a regulation on travel of the vehicle, (ii) conditional information displayed on a second indicator disposed external to the vehicle, the conditional information being indicative of a condition under which the regulation indicated by the regulatory information is to be applied, the condition being an environmental condition about an environment around the vehicle, the environmental condition including at least one of a road condition, a weather condition, an ambient light condition, and a type of a preceding vehicle, and (iii) the environment around the vehicle; and
    controlling generating the prescribed outputs based on the regulatory information in response to the environment around the vehicle satisfying the environmental condition indicated by the conditional information.

* * * * *